(12) United States Patent
Breau et al.

(10) Patent No.: US 9,407,571 B1
(45) Date of Patent: *Aug. 2, 2016

(54) GEOGRAPHICALLY APPROPRIATE DOMAIN NAME SYSTEM ASSIGNMENT

(71) Applicant: Sprint Communications Company L.P., Overland Park, KS (US)

(72) Inventors: Jeremy R. Breau, Kansas City, MO (US); Lyle Bertz, Lee's Summit, MO (US); Pallavur Sankaranaraynan, Overland Park, KS (US); John Belser, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,847

(22) Filed: Nov. 20, 2015

Related U.S. Application Data

(63) Continuation of application No. 11/933,798, filed on Nov. 1, 2007, now Pat. No. 9,197,485.

(51) Int. Cl.
*G06F 15/16* (2006.01)
*H04L 12/911* (2013.01)
*H04W 8/04* (2009.01)
*H04L 29/12* (2006.01)
*H04W 80/04* (2009.01)

(52) U.S. Cl.
CPC .............. *H04L 47/70* (2013.01); *H04L 61/10* (2013.01); *H04W 8/04* (2013.01); *H04L 61/609* (2013.01); *H04W 80/04* (2013.01)

(58) Field of Classification Search
CPC .......... H04L 47/70; H04L 61/10; H04W 8/04
USPC ........................................................ 709/245
See application file for complete search history.

(56) References Cited

U.S. PATENT DOCUMENTS

| 6,614,774 B1* | 9/2003 | Wang ................ H04L 29/12066 370/338 |
| 7,747,251 B1* | 6/2010 | Pippert ................. H04W 8/183 370/328 |
| 8,311,552 B1* | 11/2012 | Khalil .................. H04L 61/2076 455/435.1 |
| 9,197,485 B1* | 11/2015 | Breau ............... H04L 29/12066 |
| 2011/0295940 A1* | 12/2011 | Saleem ............. H04L 29/12066 709/203 |

* cited by examiner

*Primary Examiner* — Jerry Dennison

(57) ABSTRACT

Computer-readable media, systems, and methods for geographically appropriate domain name system assignment are described. In embodiments, a mobile internet protocol session is initialized with a packet data serving node, and a registration request is communicated to a home agent, the home agent acting as a router on a home network of the mobile device and enabled to tunnel one or more data packets to the mobile device when the mobile device is outside the home network. Further, in embodiments a registration reply is received from the home agent, the registration reply including a domain name system server assignment to a domain name system server acting as a translator capable of converting one or more hostnames into one or more associated IP addresses during the mobile IP session.

20 Claims, 5 Drawing Sheets

| Message Type= 0x03 | Code = 0x00 | Lifetime = 0x0000 |
|---|---|---|
| Home Address = 0x00000000 | | |
| Home Agent Address = 0x00000000 | | |
| Care of Address = 0x00000000 | | |
| Identification 0x00000000 | | |
| Identification 0x00000000 | | |
| Extension Type= 0x83 | Length = 0x00 | ASCII Encoded NAI... |
| Extension Type= 0x20 | Length = 0x00 | SPI |
| MN-HA Authentication Extension | | |
| Extension Type= 0x84 | Length = 0x00 | MN-FA Challenge Extensioin |
| Extension Type= 0xnew | Length = 0x64 | Primary DNS Server IP |
| Primary DNS Server IP | | Secondary DNS Server IP |
| Secondary DNS Server IP | | |

FIG. 4.

GEOGRAPHICALLY APPROPRIATE DOMAIN NAME SYSTEM ASSIGNMENT

CROSS-REFERENCE TO RELATED APPLICATIONS

This application is a continuation of U.S. application Ser. No. 11/933,798, filed Nov. 1, 2007, entitled "Geographically Appropriate Domain Name System Assignment," which is herein incorporated by reference in its entirety.

BRIEF SUMMARY

The present invention is defined by the claims below. Embodiments of the present invention solve at least the problems described herein by providing computer-readable media, systems, and methods for geographically appropriate domain name system ("DNS") server assignment. Embodiments of the present invention, as described herein, have several practical applications in the technical arts including, without limitation, initializing a mobile internet protocol ("IP") session with a packet data serving node ("PDSN"), communicating a registration request to a home agent ("HA"), and receiving a registration reply from the HA, the registration reply including a DNS server assignment.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a block diagram illustrating the data content of an exemplary mobile IP registration reply communicated from a HA to a mobile device, the registration reply including a geographically appropriate DNS assignment, in accordance with an embodiment of the present invention;

DETAILED DESCRIPTION

Figure 1:
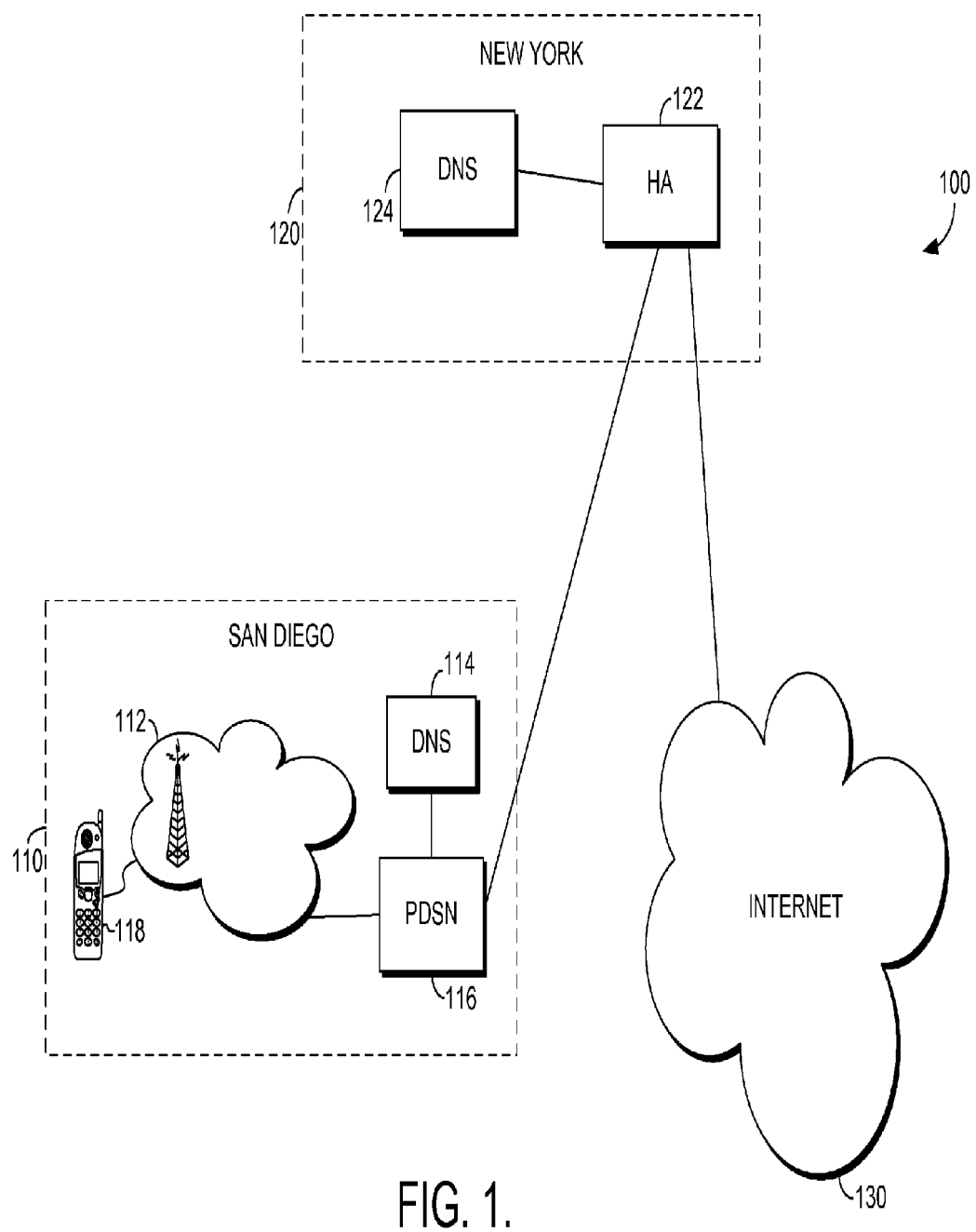
FIG. 1 is block diagram of an exemplary operating environment illustrating a geographically appropriate DNS assignment implementation, in accordance with an embodiment of the present invention.

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide systems, methods, and computer readable media for geographically appropriate DNS assignment. The geographically appropriate DNS assignment allows HAs to assign DNS servers to a mobile IP session, improving latency observed by a user of a mobile device and reducing bandwidth usage.

Acronyms and Shorthand Notations

Throughout the description of the present invention, several acronyms and shorthand notations are used to aid in the understanding of certain concepts pertaining to the associated systems and services. These acronyms and shorthand notations are solely intended for the purpose of providing an easy methodology of communicating the ideas expressed herein and are in no way meant to limit the scope of the present invention. The following is a list of these acronyms:

DNS Domain Name System
HA Home Agent
IP Internet Protocol
PDSN Packet Data Serving Node Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited references.

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media may comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Geographically Appropriate DNS Assignment

In various embodiments of the present invention, geographically appropriate DNS assignments are used to solve the problems discussed herein. For instance, when a user of a mobile IP device is outside the geographic region of the user's home network, DNS servers will be assigned to a mobile IP session by the HA in the home geographic area instead of by a PDSN in the foreign geographic area. In various embodiments, the present invention includes initializing a mobile internet protocol session with a PDSN, communicating a registration request to a HA, and receiving a registration reply from the HA, the registration reply including a DNS server assignment.

Accordingly, in one aspect, the present invention is directed to one or more computer-readable media having computer-executable instructions embodied thereon that, when executed, perform a method for assigning a geographically appropriate DNS server to a mobile device. The method includes initializing a mobile IP session with a PDSN and communicating a registration request to a HA. In this aspect, the HA acts as a router on a home network of the mobile device and is enabled to tunnel one or more data packets to the mobile device when the mobile device is outside the home network. Further, the method includes receiving a registration reply from the HA, the registration reply including a DNS server assignment to a DNS server acting as a translator capable of converting one or more hostnames into one or more associated IP addresses during the mobile IP session.

In another aspect, the present invention is directed to one or more computer-readable media having computer-executable instructions embodied thereon that, when executed, perform a method for assigning a geographically appropriate DNS server to a mobile device. In this aspect, the method includes receiving a mobile IP registration request from a mobile device seeking to register a mobile IP session with a HA. The HA is acting as a router on a home network of the mobile device and is enabled to tunnel one or more data packets to the mobile device when the mobile device is outside the home network. The method further includes communicating a registration reply to the mobile device and the registration reply includes a DNS server assignment that is issued by the HA to a DNS server. Here, the DNS server acts as a translator capable of converting one or more hostnames into one or more associated IP addresses during the mobile IP session.

In yet another aspect, the present invention is directed to one or more computer-readable media having computer-executable instructions embodied thereon that, when executed, perform a method for assigning a geographically appropriate DNS server to a mobile device. In this aspect, the method includes receiving a DNS request originating from a mobile device, where the mobile device received a DNS server assignment from a HA during registration of a mobile IP session. Further, the method includes communicating a DNS response, the DNS response translating one or more hostnames from the DNS request into one or more associated IP addresses. In this aspect, the HA acts as a router on a home network of the mobile device and is enabled to tunnel one or more data packets to the mobile device when the mobile device is outside the home network. Still further, in this aspect, the mobile device exists in a first geographical area, the HA exists in a second geographical area and the HA is configured to issue the DNS server assignment only from the second geographical area.

Having briefly described an overview of embodiments of the present invention, an exemplary operating environment is described below.

Turning now to FIG. 1, a block diagram of an exemplary operating environment illustrating a geographically appropriate DNS assignment implementation, in accordance with an embodiment of the present invention, is illustrated and designated generally as reference numeral 100. Exemplary operating environment 100 is shown with a wireless area 110, a wireless area 120, and the Internet 130. Wireless area 110 includes a radio frequency ("RF") area 112, a DNS server 114, a PDSN 116, and a mobile device 118. Mobile device 118 may include various mobile devices capable of accessing the Internet using mobile IP. Wireless area 120 may be similar to wireless area 110. Wireless area 120 includes a HA 122 and a DNS server 124. Both wireless area 110 and 120 may represent geographic areas such as cities, metropolitan areas, counties, etc. Different components may be included in wireless areas 110 and 120 than those that are shown. It will be understood and appreciated by those having ordinary skill in the art that the subset of devices illustrated here is intended for illustrative purposes to aid in the explanation of various embodiments of the present invention.

As previously discussed, a user having a mobile device, such as mobile device 118, may typically be associated with a HA in a home network, such as HA 122 in wireless area 120. When traveling, however, the user may wish to access the Internet with the mobile device using from a second wireless area, such as wireless area 110. To do so, the user's mobile device will connect with a PDSN in the second wireless area, which will tunnel communication to an HA, such as HA 122 in the first wireless area, which allows the user access to the Internet. Thus, to access the Internet, the user's mobile device will use the HA in the home network as an access point. The specific details of tunneling to a HA in a home network is beyond the scope of the present invention and will not be discussed in further detail herein. Those having ordinary skill in the art, however, will understand and appreciate that when a user of a mobile device is accessing the Internet while traveling to a wireless area different from the home network, the communications will be routed through a HA on the home network. Embodiments discussed herein refer to use of DNS servers in association with the Internet, but embodiments are not limited to only the Internet. Instead, it is contemplated and within the scope of the present invention that embodiments may be used with various packet data networks incorporating DNS servers such as, without limitation, private networks.

In typical operation of the Internet, DNS servers are used to translate human understandable hostnames, such as "www.google.com," into IP addresses that can be understood by the network, such as 0.0.0.0. Thus, when a user makes a request for an Internet address, or hostname, a request is typically sent to a DNS server to translate the hostname, and the DNS server replies with an associated IP address. The specific functionality of DNS servers is well known in the art and will not be discussed in more detail herein. In mobile IP, there are many possible DNS servers for a mobile device to seek translation from. Thus, when a mobile IP session is initiated, the PDSN assigns the mobile device an address of a DNS server to use during that session. Any Internet requests requiring translation during a mobile IP session will be forwarded by the mobile device to the DNS server to be translated. However, when a user is traveling outside the user's home network, all communications from the mobile device are first routed to the HA on the home network, such as HA 122 in wireless area 120. Conceivably, as will be understood and appreciated by those having ordinary skill in the art, when in reverse tunnel mode, communicating between a traveling mobile device and an HA can be thought of as a straw. All data packets pass through the straw from the mobile device to the HA before any other network devices may be accessed. Thus, to access the DNS server assigned to the mobile device during a mobile IP session outside the home network, the request for DNS translation must pass from the mobile device, to the HA, then to the DNS server. Similarly, the response from the DNS server (containing the requested translation) must pass from the DNS server, to the HA, and then to the mobile device.

In the above example, a user seeking to access the Internet while traveling to a foreign network will be assigned a DNS server by a PDSN in the foreign network. Typically, the PDSN will assign a DNS server that is in geographic proximity to the PDSN, such as DNS server 114 for PDSN 116 in wireless area 110. Therefore, because all communication from the mobile device must first pass through the HA in the home network, the user's DNS server request will travel from the foreign network to the HA on the home network, to the DNS server back on the foreign network. Similarly, the DNS response will travel from the foreign network, to the HA on the home network, and back to the mobile device on the foreign network. As can be appreciated by this general discussion and the more detailed discussion with reference to FIG. 2, the DNS request often spans geographic areas unnecessarily when the user is traveling because the DNS server is assigned based on geographic proximity to the PDSN instead of being assigned by, and with geographic proximity to, the HA in the home network. As will be understood and appreciated by those having ordinary skill in the art, the unnecessary spanning of geographic areas not only results in latency potentially observed by the mobile device user, but also consumes bandwidth on the backbone communications systems spanning the geographic areas. Further, as will be understood and appreciated by those having ordinary skill in the art, the exemplary embodiments discussed herein involve reverse tunnel mode. But embodiments of the present invention are not limited to reverse tunnel mode as the advances discussed herein would equally apply to triangle mode. Both reverse tunnel mode and triangle mode of Mobile IP are contemplated and within the scope of the present invention.

Figure 2:
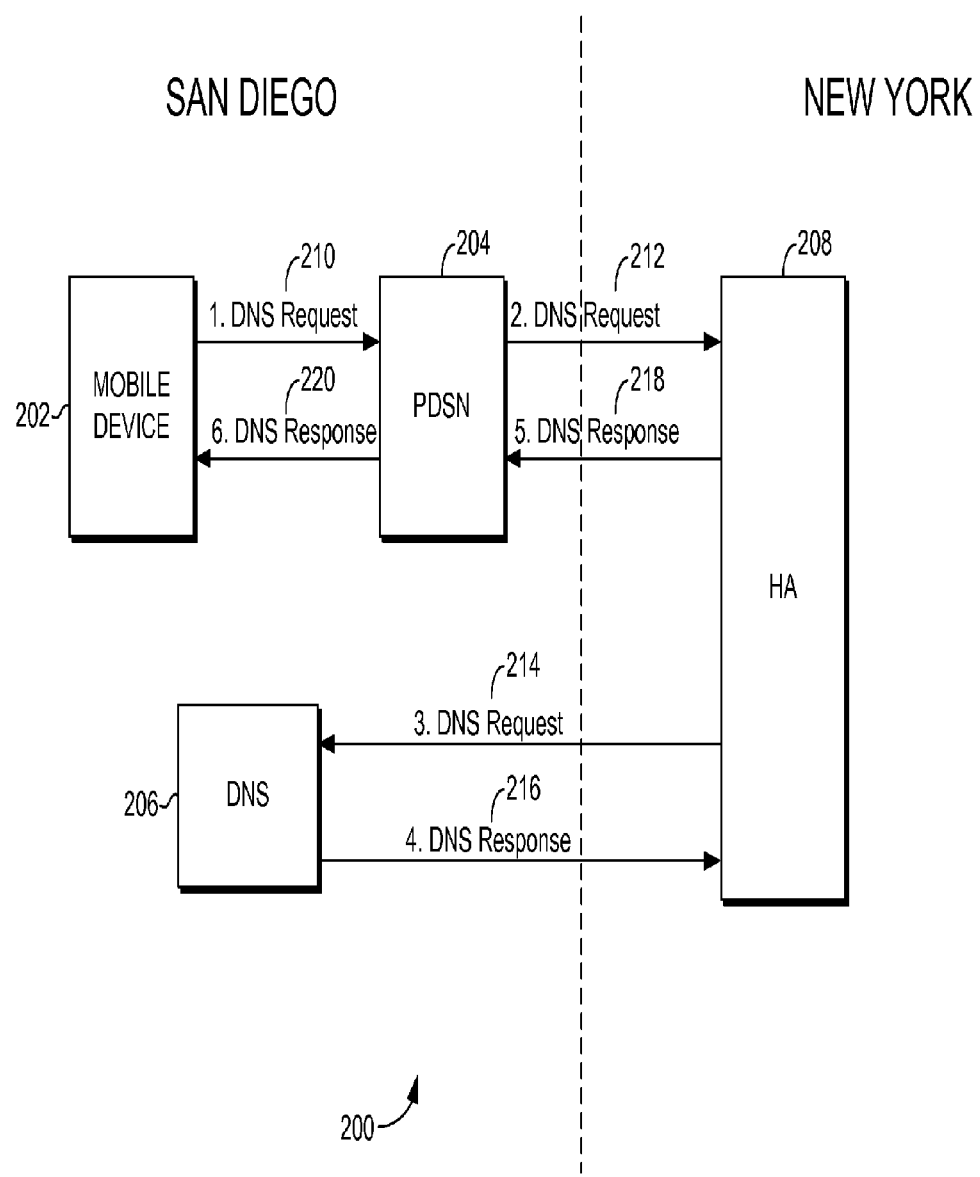
FIG. 2 is a block diagram illustrating an exemplary system having a geographically inappropriate DNS assignment in contrast to, and for comparison with, various embodiments of the present invention.

Turning now to FIG. 2, a block diagram of an exemplary system having geographically inappropriate DNS assignment in contrast to, and for comparison with, various embodiments of the present invention, is illustrated and designated generally as reference numeral 200. System 200 includes, in San Diego, a mobile device 202, a PDSN 204, and a DNS server 206. System 200 also includes, in New York, a HA 208. This configuration assumes a user with mobile device 200 and with a home network in New York traveling to San Diego and attempting to access the Internet. Thus, in the typical scenario, upon initialization of a mobile IP session, mobile device 202 will have been assigned a DNS server by the PDSN in the San Diego area, such as DNS server 206. When mobile device 202 needs a DNS translation (e.g., the user is attempting to access a website using a textual hostname such as "www.google.com"), mobile device 202 will send the request first to the HA 208 (with an intermediate hop at the PDSN), as illustrated by 210 and 212. Thus, the initial request from mobile device 202 will travel from mobile device 202 in San Diego, to PDSN 204 in San Diego, to HA 208 in New York. As discussed above, this is a typical tunneling scheme used by mobile IP when mobile device 202 is outside its home network of New York. Because PDSN 204 is assigned a San Diego DNS server 206, the DNS request must travel from HA 208 in New York back to DNS server 206 in San Diego as illustrated by 214. As previously discussed, the tunneling between mobile device 202 and HA 208 can be conceptualized as a straw and, thus, although DNS server 206 resides in San Diego, and although DNS server 206 is sending a DNS response to mobile device 202 in San Diego, the response must first travel back to HA 208 (or the other end of the straw) in New York as illustrated by 216. HA 208 can then send the DNS response to mobile device 202 in San Diego (with an intermediate hop at PDSN 204) as illustrated by 218 and 220. This configuration is in contrast to embodiments of the present invention, one of which is illustrated and discussed with reference to FIG. 3. Again, as previously discussed, some embodiments discussed herein are in the context of reverse tunnel mode. But embodiments of the present invention are not limited to reverse tunnel mode and, as will be understood and appreciated by those having ordinary skill in the art, it is contemplated and within the scope of the present invention that embodiments may be used with both reverse tunnel mode and triangle mode of Mobile IP.

Figure 3:
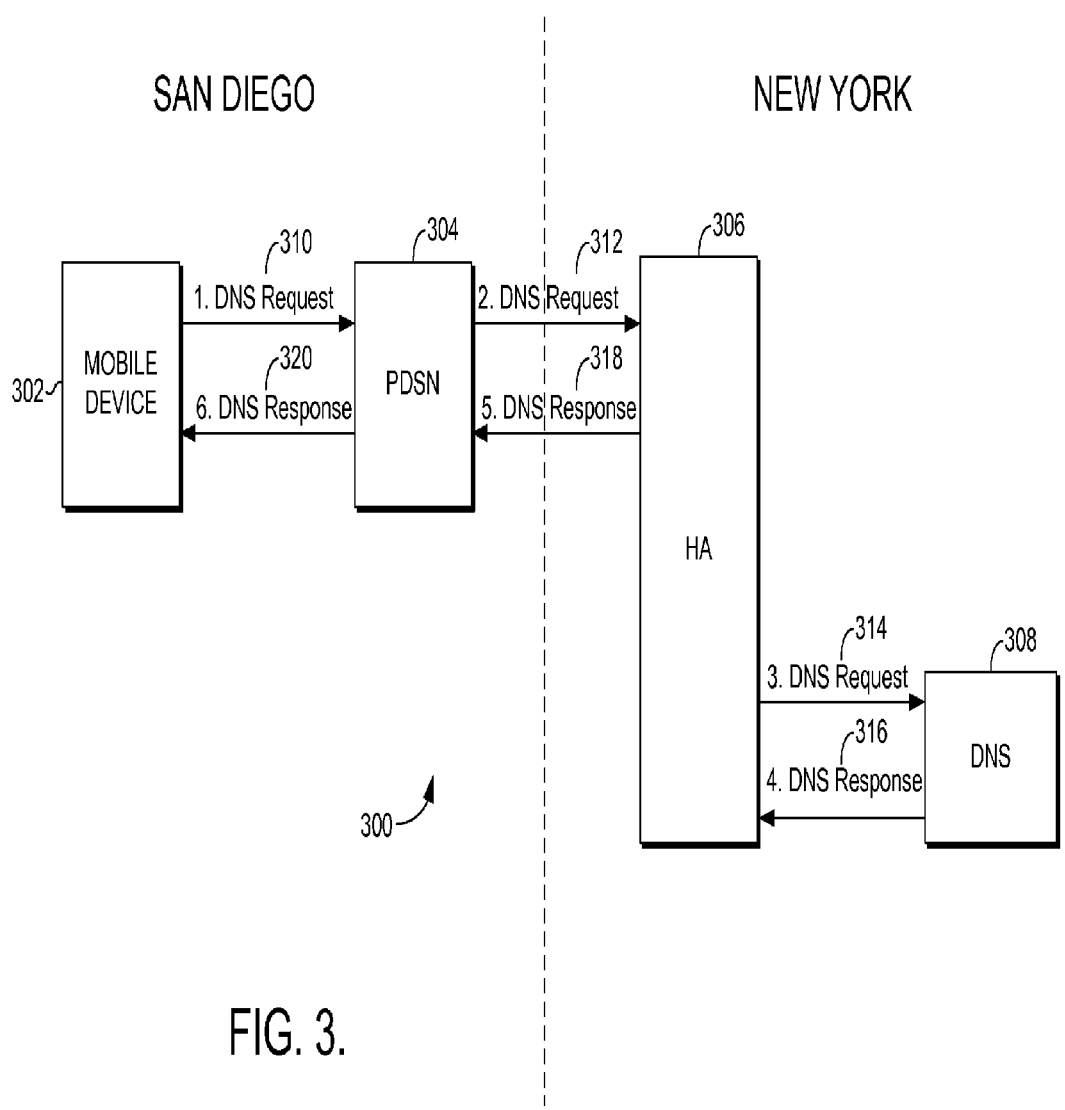
FIG. 3 is a block diagram illustrating an exemplary system implementing geographically appropriate DNS assignment, in accordance with an embodiment of the present invention, the diagram in contrast to the geographically inappropriate system of FIG. 2.

Turning now to FIG. 3, a block diagram of an exemplary system implementing geographically appropriate DNS assignment, in accordance with an embodiment of the present invention, the diagram in contrast to the geographically inappropriate system of FIG. 2 is illustrated and designated generally as reference numeral 300. System 300, includes, in San Diego, a mobile device 302 and a PDSN 304. In New York, system 300 includes HA 306 and DNS 308. This configuration again assumes a user with a home network in New York traveling to San Diego and attempting to access the Internet. Thus, in the geographically appropriate scenario, embodiments of the present invention provide for DNS server assignment by the HA upon registration of a mobile IP session. Stated differently, after initialization with the PDSN a mobile device in a foreign network, such as mobile device 302, sends a registration request to, and receives a registration reply from, its HA, such as HA 306. In embodiments of the present invention, HA 306 assigns a DNS server for the mobile IP session and includes the DNS server assignment in the registration reply sent to mobile device 302. Thus, in embodiments, HA 306 will assign a DNS server in the same geographic region, such as DNS server 308 in New York in FIG. 3. In various embodiments, PDSN 304 may still assign a DNS server upon initialization, but the DNS server assignment included in the registration reply from HA 306 will override any DNS server assigned by PDSN 304. Thus, the assigned DNS server, such as DNS server 308, will be geographically proximate to HA 306 and, using the straw analogy discussed earlier, near the end of the straw. The configuration provided in these embodiments reduces the number of cross-geographic area hops because HA 306 and DNS server 308 exist in the same geographic area. Comparing the configurations of FIGS. 2 and 3, the configuration of FIG. 2 requires four hops between San Diego and New York (e.g., at 212, 214, 216, and 218), while the configuration of FIG. 3, implementing embodiments of the present invention, only requires two hops between San Diego and New York (e.g., at 312 and 318).

Thus, in the scenario illustrated in FIG. 3, implementing embodiments of the present invention, mobile device 302 is assigned a DNS server by HA 306 upon registering a mobile IP session. When the mobile device 302 needs a DNS translation (e.g., the user is attempting to access a website using a textual hostname such as "www.google.com"), mobile device 302 will send the request first to the HA (with an intermediate hop at the PDSN), as illustrated by 310 and 312. Thus, the initial request from mobile device 302 will travel from mobile device 302 in San Diego, to PDSN 304 in San Diego, to HA 306 in New York. Again, this is the typical tunneling scheme used by mobile IP when mobile device 302 is outside its home network of New York. But because HA 306 assigns the DNS server instead of PDSN 304, the DNS request stays in New York, traveling from HA 306 to DNS server 308, as illustrated by 314. The DNS response stays in New York, going back to HA 306 (at the same end of the straw as the DNS server) as illustrated by 316. HA 306 can then send the DNS response to mobile device 302 in San Diego (again with an intermediate hop at PDSN 304) as illustrated by 318 and 320. Thus, in embodiments of the present invention, by having an HA, such as HA 306, assign a DNS server in geographic proximity to the HA, unnecessary cross-regional communications are eliminated.

Turning now to FIG. 4, a block diagram of the data content of an exemplary mobile IP registration reply communicated from a HA to a mobile device, the registration reply including a geographically appropriate DNS assignment, in accordance with an embodiment of the present invention, is illustrated and designated generally as reference numeral 400. In embodiments of the present invention, the HA, such as HA 306 of FIG. 3, communicates the IP address of the assigned DNS server, such as DNS server 308 of FIG. 3, to the mobile device in a mobile IP registration response. As will be understood and appreciated by those having ordinary skill in the art, a mobile device seeking initiation of a mobile IP session from a foreign network submits a registration request to a HA in its home network and the HA responds with a registration response. FIG. 4 illustrates a typical mobile IP registration response, along with the response extensions included in embodiments of the present invention. More specifically, in embodiments, the extensions include primary DNS server address 402, secondary DNS server address 404, as well as an extension type description 406 and an extension length description 408. Although the embodiment shown here includes both a primary DNS server address 402 and a secondary DNS server address 404, it is contemplated and within the scope of the present invention that only one DNS server address may be used or that two or more DNS server addresses may be used. The illustration of FIG. 4 is intended for illustrative purposes only to show embodiments of DNS server extensions applied to a mobile IP registration response.

Figure 5:
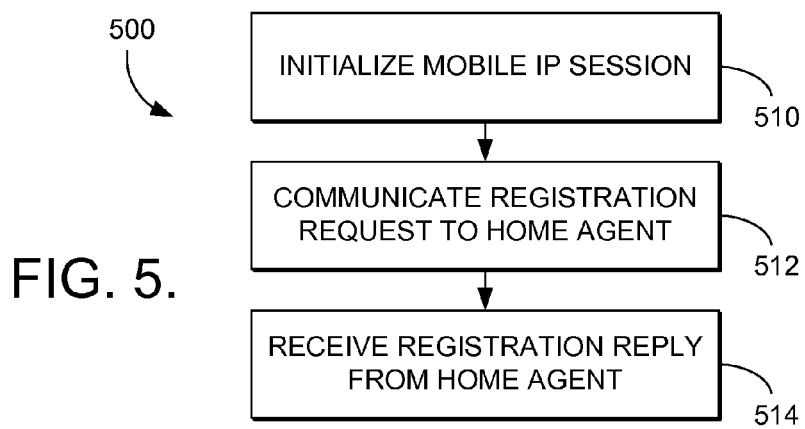
FIG. 5 is a flow diagram illustrating an exemplary method for geographically appropriate DNS assignment, in accordance with an embodiment of the present invention.

Turning now to FIG. 5, a flow diagram of an exemplary method for geographically appropriate DNS assignment, in accordance with an embodiment of the present invention, is illustrated and designated generally as reference numeral 500. Initially, as indicated at block 510, a mobile IP session is initialized with a PDSN, e.g., PDSN 304 of FIG. 3. As will be understood and appreciated by those having ordinary skill in the art, the method illustrated in FIG. 5 is from the point of view of the mobile device, e.g. mobile device 302 of FIG. 3. Thus, the next step, as indicated at block 512, is to communicate a registration request to a HA, e.g., HA 306 of FIG. 3. In embodiments of the present invention, the HA acts as a router on the home network of the mobile device and is enabled to tunnel one or more data packets to and from the mobile device when the mobile device is outside the home network. For instance, when a mobile device makes a DNS request, the request will be tunneled to the HA before being directed to the DNS server and the DNS response will be send back to the HA before being tunneled to the mobile device.

Next, as illustrated at block 514, a registration reply is received from the HA. In embodiments, the registration reply includes a DNS server assignment to a DNS server. The DNS server may act as a translator capable of converting one or more hostnames into one or more associated IP addresses during the mobile IP session, as previously stated. In various embodiments of the present invention, the mobile device will exist in a first geographical area, the HA will exist in a second geographical area, and the HA will be configured to issue a DNS server assignment only from the second geographical area. Thus, as previously discussed, the DNS server assignments will be geographically proximate to the HA, resulting in a scheme that is geographically appropriate because a DNS request exiting a mobile IP tunnel at the geographic location of the HA will not have to be routed back to another geographic location where the DNS server resides. Instead, in embodiments, the HA will assign a DNS server from the same geographical area that the HA resides in. Also, as previously stated, in embodiments, the PDSN will still assign a DNS server upon initialization of a mobile IP session (even before the mobile device sends a registration request). But, in these embodiments, once the mobile device receives a registration response, the device will override any DNS serve assignment with the DNS server assignment received from the HA.

Figure 6:
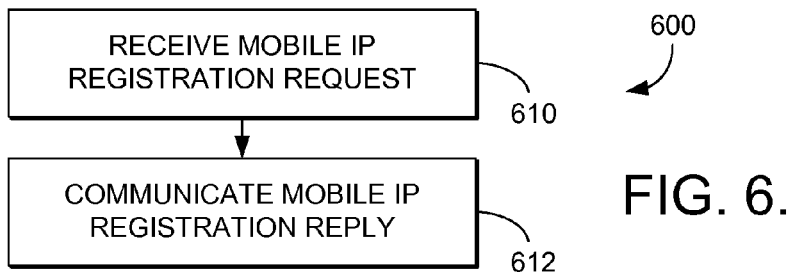
FIG. 6 is a flow diagram illustrating an exemplary method for geographically appropriate DNS assignment, in accordance with an embodiment of the present invention, the flow diagram having a different perspective than the flow diagram of FIG. 5.

Turning now to FIG. 6, a flow diagram of an exemplary method for geographically appropriate DNS assignment, in accordance with an embodiment of the present invention, the flow diagram having a different perspective than the flow diagram of FIG. 5 is illustrated and designated generally as reference numeral 600. Initially, as indicated at block 610, a mobile IP registration request is received, e.g., by HA 306 of FIG. 3, from a mobile device, e.g., mobile device 302 of FIG. 3, seeking to register a mobile IP session with a HA. In embodiments, the HA acts as a router on a home network of the mobile device and is enabled to tunnel one or more data packets to and from the mobile device when the mobile device is outside the home network. Next, as illustrated at block 612, a registration reply is communicated to the mobile device. In embodiments, the registration reply includes a DNS server assignment, issued by the HA. Also, in embodiments, the DNS server acts as a translator capable of converting one or more hostnames into one or more associated IP addresses during the mobile IP session.

Figure 7:
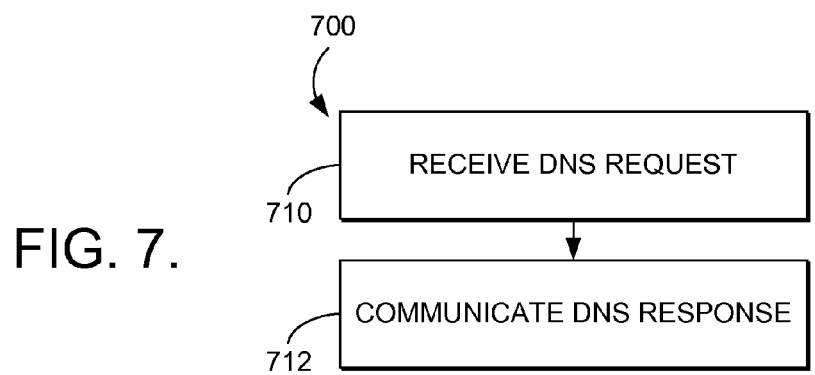
FIG. 7 is a flow diagram illustrating an exemplary method for geographically appropriate DNS assignment, in accordance with an embodiment of the present invention, the flow diagram having a different perspective than the flow diagrams of FIGS. 5 and 6.

Turning now to FIG. 7, a flow diagram of an exemplary method for geographically appropriate DNS assignment, in accordance with an embodiment of the present invention, the flow diagram having a different perspective than the flow diagrams of FIGS. 5 and 6, is illustrated and designated generally as reference numeral 700. Initially, as indicated at block 710, a DNS request is received, e.g., by DNS server 308 of FIG. 3. In embodiments, the mobile device has received an assignment to the DNS server from a HA during registration of a mobile IP session. Next, as indicated at block 712, a DNS response is communicated that translates one or more hostnames from the DNS request into one or more associated IP addresses. In embodiments, the HA acts as a router on the home network of the mobile device and is enabled to tunnel one or more data packets to and from the mobile device when the mobile device is outside the home network. Also, in embodiments, the mobile device exists in a first geographical area, the HA exists in a second geographical area, and the HA is configured to issue the DNS server assignment only from the second geographical area.

In the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. A method for assigning a geographically appropriate domain name system ("DNS") server to a mobile device, comprising:
   initializing a mobile internet protocol ("IP") session for the mobile device with a packet data serving node ("PDSN");
   communicating a registration request to a home agent, the home agent acting as a router on a home network of the mobile device and enabled to tunnel one or more data packets to and from the mobile device when the mobile device is outside the home network; and
   receiving a registration reply from the home agent for the mobile device, the registration reply including a DNS server assignment to a geographically appropriate DNS server, wherein the DNS server is operable to receive, from the mobile device, a DNS query including a hostname not associated with the mobile device, and to respond with an IP address corresponding to said hostname.

2. The method of claim 1:
   wherein the mobile device is located within a first geographical area,
   wherein the home agent is located within a second geographical area, and
   wherein the home agent is configured to assign a DNS server that is located in the second geographical area.

3. The method of claim 2, wherein the DNS server assignment is a set of mobile IP extensions to the registration reply.

4. The method of claim 3, wherein the set of mobile IP extensions includes a primary DNS server assignment and a secondary DNS server assignment.

5. The method of claim 4, wherein the primary DNS server assignment is an IP address of a first DNS server and the secondary DNS server assignment is an IP address of a second DNS server.

6. The method of claim 5, wherein the PDSN assigns an initial DNS server for the mobile IP session upon initialization.

7. The method of claim 6, wherein the mobile device overrides the DNS server assigned by the PDSN with the DNS server assignment received in the registration reply from the home agent.

8. A system for assigning a geographically appropriate domain name system ("DNS") server to a mobile device, comprising:
   a home agent, comprising one or more processors, wherein the home agent is configured to
      A) receive a mobile internet protocol ("IP") registration request from the mobile device seeking to register a mobile IP session with the home agent, the home agent acting as a router on a home network of the mobile device and enabled to tunnel one or more data packets to and from the mobile device when the mobile device is outside the home network, and
      B) communicate a registration reply to the mobile device, the registration reply including a DNS server assignment, issued by the home agent, to a geographically appropriate DNS server; and
   the DNS server, comprising one or more processors, wherein the DNS server is configured to receive, from the mobile device, a DNS query including a hostname not associated with the mobile device, and to respond with an IP address corresponding to said hostname.

9. The system of claim 8,
   wherein the mobile device is located in a first geographical area,
   wherein the home agent is located in a second geographical area, and
   wherein the home agent is configured to assign a DNS server that is located in the second geographical area.

10. The system of claim 9, wherein the DNS server assignment is a set of mobile IP extensions to the registration reply.

11. The system of claim 10, wherein the set of mobile IP extensions includes a primary DNS server assignment and a secondary DNS server assignment.

12. The system of claim 11, wherein the primary DNS server assignment is an IP address of a first DNS server and the secondary DNS server assignment is an IP address of a second DNS server.

13. The system of claim 12, wherein a packet data serving node ("PDSN") assigns an initial DNS server for the mobile IP session upon initialization.

14. The system of claim 13, wherein the mobile device overrides the DNS server assigned by the PDSN with the DNS server assignment received in the registration reply from the home agent.

15. A network device for assigning a geographically appropriate domain name system ("DNS") server to a mobile device, wherein the network device is configured to:
   receive a DNS request originating from the mobile device, the mobile device having received a DNS server assignment to a geographically appropriate DNS server from a registration reply from a home agent during registration of a mobile internet protocol ("IP") session;
   communicate a DNS response, the DNS response translating one or more hostnames from the DNS request into one or more associated IP addresses,
   wherein the home agent acts as router on a home network of the mobile device and is enabled to tunnel one or more data packets to and from the mobile device when the mobile device is outside the home network,
   wherein the mobile device is located in a first geographical area,
   wherein the home agent is located in a second geographical area, and
   wherein the home agent is configured to assign a DNS server that is located in the second geographical area.

16. The network device of claim 15, wherein the DNS server assignment is a set of mobile IP extensions to the registration reply.

17. The network device of claim 16, wherein the set of mobile IP extensions includes a primary DNS server assignment and a secondary DNS server assignment.

18. The network device of claim 17, wherein the primary DNS server assignment is an IP address of a first DNS server and the secondary DNS server assignment is an IP address of a second DNS server.

19. The network device of claim 18, wherein a packet data serving node ("PDSN") assigns a DNS server for the mobile IP session upon initialization.

20. The network device of claim 19, wherein the mobile device overrides the DNS server assigned by the PDSN with the DNS server assignment received in the registration reply from the home agent.

* * * * *